3,355,452
DERIVATIVES OF 7-AMINO-CEPHALO-SPORANIC ACID

Jakob Urech, Basel, Bruno Fechtig, Binningen, Rolf Bosshardt, Basel, Hans Bickel and Karl Schenker, Binningen, and Max Wilhelm, Allschwil, Switzerland, assignors to Ciba Corporation, New York, N.Y., a corporation of Delaware
No Drawing. Filed June 1, 1965, Ser. No. 460,475
Claims priority, application Switzerland, June 5, 1964, 7,338/64; Apr. 2, 1965, 5,497/65
14 Claims. (Cl. 260—243)

The present invention provides new derivatives of 7-amino-cephalosporanic acid and a special process for their manufacture. The new derivatives are O-desacetyl-O-carbamoyl-7-acylamino-cephalosporanic acids whose 7-N-acyl group is a carboxylic acid radical, the CO group of which is bonded to a carbon atom, and the salts thereof, especially the compound of the Formula I

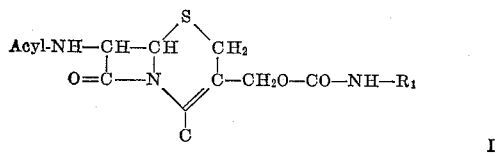

in which Acyl has the meaning given above and $R_1$ represents an acyl group such as, for example, lower alkylsulfonyl or arylsulfonyl, such as methyl-, phenyl- or tolylsulfonyl, or lower alkanoyl or lower alkoxycarbonyl or an unsubstituted or substituted hydrocarbon radical, for example, a monocyclic or bicyclic aromatic radical, such as an unsubstituted or substituted phenyl or naphtyl radical, or, above all, a straight-chain or branched aliphatic hydrocarbon radical advantageously containing at most 6 carbon atoms, for example, a lower alkyl radical such as a methyl, ethyl, propyl or isopropyl radical, or a lower alkenyl radical such as a vinyl or allyl radical. As substituents of aromatic radicals there may be present, for example, one or more lower alkyl or alkoxy groups, nitro groups and halogen atoms; substituents of aliphatic hydrocarbon radicals are, for example, aromatic radicals such as phenyl, halogenphenyl and nitrophenyl radicals, and primarily halogen atoms such as bromine, iodine, fluorine and especially chlorine, as well as lower alkoxy- or lower alkyl-mercapto groups having at most 5 carbon atoms The halogen atoms are advantageously in β-position to the amino group. $R_1$ is, for example, a benzyl or benzhydryl group, but more especially a 2-halogen-ethyl, 2-halogen - propyl, 1 - methyl - 2-halogen-propyl or 1:1-dimethyl-2-halogen-ethyl group, or a methyl or ethyl group.

The 7-N-acyl radical is an aliphatic, aromatic, heterocyclic, araliphatic or heterocyclylaliphatic carboxylic acid radical, especially the acyl radical of 7-acylamino-cephalosporanic acids and 6-acylamino-penicillanic acids that are known to be effective, for example, a radical of the formula $$R_2(CH_2)_nCO$$

in which $n$ represents an integer of 0 to 4, preferably 1, and $R_2$ represents an unsubstituted or substituted aryl, cycloalkyl, or heterocyclyl radical or, when $n$ is 1 to 4, also an aryloxy, arylthio, cycloalkoxy, heterocyclyloxy or heterocyclylthio radical, the aryl or heterocyclyl radicals being monocyclic or dicyclic, for example, 2:6-dimethoxybenzoyl, tetrahydronaphthoyl, 2-methoxynaphthoyl, 2-ethoxy - naphthoyl, 3-pyridyl - benzoyl, phenyl - acetyl, phenoxy-acetyl, S-phenyl-thioacetyl, S-bromophenyl-thio-acetyl, α-phenoxypropionyl, α-phenoxyphenylacetyl, α-methoxyphenylacetyl, α-methoxy - 3:4 - dichloro-phenylacetyl, pyridyl(3)-acetyl, pyridyl(2)-acetyl, benzyloxy-carbonyl, S-benzylthioacetyl, S-benzylthiopropionyl, hexahydrobenzyl-oxycarbonyl, cyclopentanoyl, cyclohexanoyl, 2-thienylacetyl, 3-thienylacetyl, 2-furylacetyl, 2-indolylactyl, 2-phenyl-5-methyl - isoxazolyl - carbonyl, 2-(2' - chlorophenyl) - 5-methyl-isoxazolyl carbonyl, indenyl carbonyl, or a radical of the formula $$C_nH_{2n+1}CO \text{ or } C_nH_{2n-1}CO$$

in which $n$ represents an integer of 1 to 7, and the chain is straight or branched and, if necessary, is interrupted by an oxygen atom or a sulfur atom or is substituted by halogen, carboxy or amino, for example, a propionyl, butyryl, hexanoyl, octanoyl, butylthioacetyl, acrylyl, crotonyl, 2-pentenoyl, allylthioacetyl, chloroacetyl, β-bromopropionyl, aminoacetyl, or α-carboxypropionyl radical.

The salts of the new compounds are metal salts, above all, the salts of therapeutically useful metals of the groups of alkali metals or alkaline earth metals such as sodium, potassium, ammonium or calcium, or salts with organic bases, for example, with triethylamine, N-ethylpiperidine, dibenzylethylenediamine, N,N' - bis - (dehydroabiethyl)-ethylenediamine or procaine or others such as are known to be useful for preparing salts of penicillins or cephalosporins.

The new compounds are very stable towards penicillinases and cephalosporinases. Under the conditions of therapeutic application they are stable. They display antibacterial activity towards Gram-positive bacteria, for example, *Staphylococcus aureus*, and especially towards penicillin-resistant strains, but, above all, towards Gram-negative bacteria, for example, *Escherichia coli, Klebsiella pneumoniae, Salmonella typhosa* and *Bact. proteus*. They may therefore be used for combating infections caused by gram-positive or gram-negative micro organisms, and also as additives for animal feedstuffs and in the preservation of foodstuffs or as disinfectants. For these purposes they are administered in the same way as other half-synthetic cephalosporins for instance 7-(thienylacetylamino)-cephalosporanic acids.

Compounds that are specially valuable are those in which $R_1$ represents a halogen-substituted lower alkyl radical, and the 7-N-acyl radical is a phenylacetyl radical, a phenoxyacetyl radical, an S-phenylthioacetyl radical or a thienylacetyl radical.

The new compounds are obtained when desacetyl-7-amino-cephalosporanic acid, whose 7-amino group is substituted by a carboxylic acid radical whose CO group is bonded to a carbon atom or by an eliminable radical different from such an acyl radical is reacted with an isocyanic acid ester of the formula $$R_1-N=C=O$$

and, if desired or required, an eliminable radical attached to the 7-amino group in the compounds thus obtained is split off, and the O-desacetyl-O-carbamoyl-7-amino-cephalosporanic acid thus obtained is acylated with the radical of a carboxylic acid whose CO group is bonded to a carbon atom.

An eliminable radical which is different from the 7-acyl radical as defined in the end product of the present invention, is for example, the tertiary butyloxy-carbonyl radical, the trityl radical or a carbobenzoxy radical which may be substituted, for example by the nitro group, halogen atoms, or a lower alkoxy group. After the reaction with the isocyanic acid ester, these radicals can be split off in the usual manner by hydrolysis or hydrogenolysis, and the resulting compound having a free amino group then be acylated with the desired acyl radical. In this manner, it is possible to introduce also acyl radicals that react with the isocyanic acid ester.

It is surprising that the process herein described gives good yields. Hitherto, desacetyl-7-acylaminocephalosporanic acid could either not be acylated at the oxygen or only with poor yields. In the usual methods, for example, with acid chlorides or acid anhydrides, above all the lactone and substances having an opened lactam ring are formed, and almost no acyl derivative. It could not be expected that the reaction with esters of isocyanic acid would product O-acylderivatives smoothly and in good yield.

The reaction between the desacetyl compound and the isocyanic acid ester is advantageously carried out in the presence of a strong organic nitrogen base, for example, triethylamine, in an inert solvent, for example, dimethyl formamide, methylene chloride, tetra-hydrofuran or acetonitrile.

The acylation at the 7-amio group is performed, for example, by means of an acid halide, e.g. an acid chloride or a mixed anhydride, e.g. one with a monoesterified carbonic acid or with the free acid itself in the presence of a condensing agent, such as a carbodiimide, e.g. dicyclohexylcarbodiimide.

The new compounds may be used as medicaments, for example, in the form of pharmaceutical preparations containing the said compounds in admixture with an organic or inorganic, solid or liquid pharmaceutical excipient suitable for enteral, parenteral or local administration. Suitable excipients are substances that do not react with the new compounds, for example, water, gelatine, lactose, starch, magnesium stearate, talc, vegetable oils, benzyl alcohols, gums, propylene glycol, polyalkylene glycols, white petroleum jelly, cholesterol, and other known medicinal excipients. The pharmaceutical preparations may be, for example, tablets, dragees, ointments, creams or capsules, or in liquid form as solutions, suspensions or emulsions. They may be sterilized and/or contain assistants such as preserving, stabilizing, wetting or emulsifying agents, salts for regulating the osmotic pressure or buffers. They may further contain other therapeutically valuable substances. The preparations are prepared by conventional methods.

The following examples illustrate the invention.

For the thin-layer chromatography on silica gel the following systems are used.

System I=n-butanol+glacial acetic acid (10:1), saturated with water;
System II=n-butanol+pyridine+glacial acetic acid+water (30:20:6:20);
Iodine vapor is used as indicator.

Example 1

300 milligrams (0.71 mmol) of the triethylammonium salt of crude desacetyl-7-thienylacetylaminocephalosporanic acid (of about 60% purity) are taken up in 3 millilitres of freshly degassed dimethyl formamide, 2.6 millilitres of a 10% solution of absolute tributylamine (1.42 mmol) in dimethyl formamide and 1.5 millilitres of a 10% solution of β-chloroethylisocyanate (1.42 mmols) in dimethyl formamide, and the whole is allowed to react for 2 hours at 20° C. During the whole reaction period the reaction mixture is exposed to ultrasonic waves of a frequency of 45 kHz. Subsequently, the batch is evaporated to dryness in vacuo, the residue is dissolved in a 1:1 mixture of ethyl acetate and 0.1 M phosphate buffer pH 7 and the solution is acidified to pH 2.0 with concentrated phosphoric acid. After stirring for ½ hour at 20° C., the pH of the mixture is adjusted to 8.0 with an aqueous tripotassium phosphate solution of 50% strength and then washed with ethyl acetate. The aqueous phase is adjusted to pH 2.0 with concentrated hydrochloric acid and the product is extracted with ethyl acetate. The extract is dried over sodium sulfate and yields 188 milligrams of pure O-desacetyl-O-(β-chlorethylcarbamoyl)-7-thienylacetylamino-cephalosporanic acid when evaporated in vacuo, $Rf$ I=0.46; $Rf$ II=0.60.

Example 2

300 milligrams (0.71 mmol) of the triethylammonium salt of crude desacetyl-7-thienylacetylamino-cephalosporanic acid in 3 millilitres of dimethyl formamide are reacted with 1.3 millilitres of 10% chloromethylisocyanate in dimethyl formamide (1.42 mmol) and 2.6 millilitres of 10% tributylamine in dimethylformamide (1.42 mmol) in the manner described in Example 1, and the batch is then worked up in the manner described in that example. 93 milligrams of O-desacetyl-O-chloromethylcarbamoyl-7-thienylacetylamino-cephalosporanic acid are obtained. $Rf$ I=0.58; $Rf$ II=0.79.

Example 3

300 milligrams (0.71 mmol) of the crude triethylammonium salt of desacetyl-7-thienylacetylamino-cephalosporanic acid, 3 millilitres of dimethyl formamide, 2.6 millilitres of 10% tributylamine in dimethyl formamide (1.42 mmol) and 1.4 millilitres of 10% tertiarybutylisocyanate in dimethyl formamide (1.42 mmol) are allowed to react for 16 hours and then worked up, as described in Example 1. 163 milligrams of O-desacetyl-O-tertiarybutylcarbamoyl-7-thienylacetylamino-cephalosporanic acid are obtained. $Rf$ I=0.55; $Rf$ II=0.65.

Example 4

300 milligrams (0.71 mmol) of the crude triethylammonium salt of desacetyl-7-thienylacetylamino-cephalosporanic acid are reacted for 16 hours with 1.42 mmol of ethylisocyanate in dimethyl formamide and in the presence of tributylamine in a manner analogous to that described in Example 1. 106 milligrams of O-desacetyl-O-ethylcarbamoyl-7-thienylacetylamino-cephalosporanic acid are obtained. $Rf$ I=0.38; $Rf$ II=0.57.

Example 5

300 milligrams of the crude triethylammonium salt of desacetyl-7-thienylacetylamino-cephalosporanic acid yield 92 milligrams of O-desacetyl-O-methylcarbamoyl-7-thienylacetylamino-cephalosporanic acid when reacted for 16 hours with 1.42 mmol of methylisocyanate in the manner described in Example 1. $Rf$ I=0.36; $Rf$ II=0.58.

Example 6

300 milligrams of the crude triethylammonium salt of desacetyl-7-thienylacetylamino-cephalosporanic acid yield 169 milligrams of O-desacetyl-O-(chlorotertiary-butylcarbamoyl)-7-thienylacetylamino-cephalosporanic acid when reacted for 3 hours with 1.42 mmol of chlorotertiarybutylisocyanate in the manner described in Example 1. $Rf$ I=0.58; $Rf$ II=0.73.

Example 7

300 milligrams of the crude triethylammonium salt of desacetyl-7-thienylacetylamino-cephalosporanic acid yield 210 milligrams of O-desacetyl-O-carbethoxy-carbamoyl-7-thienylacetylamino-cephalosporanic acid when reacted for 1 hour with 1.42 mmols of carbethoxyisocyanate in the manner described in Example 1. $Rf$ I=0.54; $Rf$ II=0.64.

Example 8

300 milligrams of the crude triethylammonium salt of desacetyl-7-thienylacetylamino-cephalosporanic acid are reacted with 1.42 mmols of tosylisocyanate for 1½ hours in the manner described in Example 1 to form 139 milligrams of O-desacetyl-O-tosylcarbamoyl-7-thienylacetyl-amino-cephalosporanic acid. $Rf$ I=0.56; $Rf$ II=0.71.

Example 9

300 milligrams of the triethylammonium salt of crude desacetyl-7-phenylacetylamino-cephalosporanic acid (about 60%) (0.67 mmol) are taken up in 3 millilitres of dimethylformamide and 2.5 millilitres of 10% tributylamine in dimethyl formamide (1.34 mmol) and reacted for 1 hour with 1.4 millilitres of 10% para-chlorethylisocyanate in dimethyl formamide (1.34 mmol) and then worked up as described in Example 1. 160 milligrams of O-desacetyl-O-(para-chlorethyl-carbamoyl)-7-phenyl-acetyl-cephalosporanic acid are obtained. Rf I=0.47; Rf II=0.60.

Example 10

When 300 milligrams of the crude triethylammonium salt of desacetyl - 7 - phenylacetylamino-cephalosporanic acid are reacted for 1 hour with 1.34 mmol of chloromethylisocyanate in the manner described in Example 9, 73 milligrams of O-desacetyl-O-chloromethylcarbamoyl-7-phenylacetyl-cephalosporanic acid are obtained. Rf I=0.58; Rf II=0.77.

Example 11

When 300 milligrams of the crude triethylammonium salt of desacetyl - 7 - phenylacetylamino-cephalosporanic acid are reacted for 16 hours with 1.34 mmol of tertiary-butylisocyanate in a manner analogous to that described in Example 9, 154 milligrams of O-desacetyl-O-tertiary-butylcarbamoyl - 7 - phenylacetylamino-cephalosporanic acid are obtained. Rf I=0.51; Rf II=0.62.

Example 12

When 300 milligrams of the crude triethylammonium salt of desacetyl - 7 - phenylacetylamino-cephalosporanic acid are reacted for 16 hours with 1.34 mmol of ethylisocyanate in a manner analogous to that described in Example 9, 121 milligrams of O-desacetyl-O-ethylcarbamoyl-7-phenylacetylamino-cephalosporanic acid are obtained. Rf I=0.38; Rf II=0.55.

Example 13

When 300 milligrams of the crude triethylammonium salt of desacetyl - 7 - phenylacetylamino-cephalosporanic acid are reacted for 16 hours with 1.34 mmol of methylisocyanate in the manner described in Example 9, 98 milligrams of O-desacetyl-O-methylcarbamoyl-7-phenylacetylamino-cephalosporanic acid are obtained. Rf I=0.35; Rf II=0.59.

Example 14

When 300 milligrams of the crude triethylammonium salt of desacetyl - 7 - phenylacetylamino-cephalosporanic acid are reacted for 3 hours with 1.34 mmol of chloro-tertiary-butylisocyanate in the manner described in Example 9, 149 milligrams of O-desacetyl-O-(chloro-tertiary-butylcarbamoyl) - 7 - phenylacetylamino-cephalosporanic acid are obtained. Rf I=0.57; Rf II=0.74.

Example 15

300 milligrams of the triethylammonium salt of crude desacetyl - 7 - (S-phenylthioacetylamino)-cephalosporanic acid of about 50% strength (0.62 millimol) are taken up in 3 millilitres of dimethyl formamide and 2.3 millilitres of 10% tributylamine in dimethyl formamide (1.24 millimol) and reacted with 1.3 millilitres of a 10% solution of β-chlorethylisocyanate in dimethyl formamide for 3 hours as described in Example 1 and then worked up. 127 milligrams of O-desacetyl-O-(β-chlorethylcarbamoyl)-7-(S-phenylthioacetylamino)-cephalosporanic acid are obtained. Rf I=0.46; Rf II=0.58.

Example 16

When 300 milligrams of the starting material used in Example 15 are reacted for 16 hours with 1.24 millimol of ethylisocyanate in the manner described in that example, 94 milligrams of O-desacetyl-O-ethylcarbamoyl-7-(S-phenylthioacetylamino)-cephalosporanic acid are obtained. Rf I=0.44; Rf II=0.58.

Example 17

When the starting material used in Example 15 is reacted for 16 hours with 1.24 mmol of methylisocyanate in the manner described in that example, 88 milligrams of O-desacetyl-O-methylcarbamoyl - 7 - (S-phenylthio-acetylamino)-cephalosporanic acid are obtained. Rf I=0.37; Rf II=0.57.

Example 18

When the starting material used in Example 15 is reacted for 16 hours with 1.24 mmol of benzhydrylisocyanate in the manner described in that example, 148 milligrams of O-desacetyl-O-benzhydrylcarbamoyl - 7 - (S-phenylthioacetylamino)-cephalosporanic acid are obtained. Rf I=0.58; Rf II=0.68.

Example 19

322 mg. (1 mmol) of O-desacetyl-7-thienylacetyl-amino-cephalosporanic acid are dissolved in 5.5 ml. of 10% solution of phenylisocyanate (2 mmols) in dimethyl-dimethyl formamide, the whole treated with 2.4 ml. of a 10% solution of phenylisocyanate (2 mmols) in dimethyl-formamide, and allowed to react at 22° C. for 4 hours. The batch is evaporated under a pressure of 0.1 mm. of Hg, the residue dissolved in 10% aqueous dipotassium hydrogen phosphate solution, and the solution washed with ethyl acetate. The aqueous phase is given a pH of 2.0 with concentrated hydrochloric acid, and extracted with ethyl acetate. Drying of the extract over sodium sulfate and evaporation result in a residue which is dissolved in 3 ml. of ether+acetone (3:1). When the solution is allowed to stand in the cold, a by-product crystallizes out, whereas the evaporated mother liquor contains the O-desacetyl-O-phenylcarbamoyl-7-thienylacetylamino-cephalosporanic acid which according to the thin-layer chromatogram is unitary. Thin-layer chromatogram on silicagel in the system n-butanol+glacial acetic (10:1) saturated with water:

O - desacetyl - 7 - thienylacetylamino-cephalo-
  sporanic acid _____ Rf=0.27
By-product _____ Rf=0.40
O-desacetyl - O - phenylcarbamoyl - 7 - thienyl-
  acetylamino-cephalosporanic acid _____ Rf=0.50

What is claimed is:
1. Process for the manufacture of O-desacetyl-O-carbamoyl-7-acylamino-cephalosporanic acids whose 7-N-acyl group is a carboxylic acid radical, the CO group of which is bonded to a carbon atom, wherein desacetyl-7-amino-cephalosporanic acid, whose 7-amino group is substituted by a member selected from the group consisting of (1) an acyl group of the formula $R_2(CH_2)_nCO$, in which $n$ stands for a whole number from 0 to 4 and $R_2$ represents a member selected from the group consisting of phenyl, naphthyl, phenoxy, phenylmercapto, heterocyclyloxy having 5 to 6 ring members, heterocyclylthio having 5 to 6 ring members, cycloalkyl having 5 to 6 ring carbon atoms and heterocyclyl having 5 to 6 ring members, the heteroatom of each of said heterocyclyl moieties being a member selected from the group consisting of nitrogen, sulfur and oxygen, and (2) an eliminable radical selected from the group consisting of t-butoxycarbonyl, trityl, carbobenzoxy and said carbobenzoxy group substituted by a member selected from the group consisting of nitro, halogen and lower alkoxy is reacted in an inert organic solvent at ambient temperature with an isocyanic acid ester of the formula

$$R_1—N=C=O$$

in which $R_1$ represents a member selected from the group consisting of lower alkyl-sulfonyl, phenyl-sulfonyl, tolyl-sulfonyl, lower alkanoyl, lower alkoxycarbonyl, lower aliphatic hydrocarbon, lower aliphatic hydrocarbon substituted by at least one member selected from the group consisting of phenyl, halogenphenyl, nitrophenyl, halogen, lower alkoxy and lower alkyl-mercapto, phenyl, naphthyl, phenyl substituted by a member selected from the group consisting of lower alkyl, lower alkoxy, nitro and halogen, naphthyl substituted by a member selected from the group consisting of lower alkyl, lower alkoxy, nitro and halogen, and said eliminable radical attached to the 7-amino group in a compound thus obtained is split off and the O-desacetyl-O-carbamoyl - 7 - aminocephalosporanic acid thus obtained is 7-N acylated to provide said $R_2(CH_2)_nCO$ substitutent attached to the 7-amino group.

2. Process according to claim 1, wherein the desacetyl compound is reacted with the isocyanic acid ester in the presence of a strong tertiary amine base.

3. Process according to claim 1, wherein the desacetyl compound is reacted with the isocyanic acid ester in the presence of a tri-(lower alkyl)amine.

4. Process according to claim 1, wherein the reaction is performed in dimethyl formamide.

5. O-desacetyl-O-carbamoyl - 7 - acylaminocephalosporanic acid whose 7-N-acyl group is one of the formula $R_2(CH_2)_nCO$, in which $n$ stands for a whole number from 0 to 4 and $R_2$ represents a member selected from the group consisting of phenyl, naphthyl, phenoxy, phenylmercapto, heterocyclyloxy having 5 to 6 ring members, heterocyclylthio having 5 to 6 ring members, cycloalkyl having 5 to 6 ring carbon atoms and heterocyclyl having 5 to 6 ring members, the heteroatom of which is a member selected from the group consisting of nitrogen, sulfur and oxygen, and whose carbamoyl group has the formula $-CO-NHR_1$, in which $R_1$ stands for a member selected from the group consisting of lower alkyl-sulfonyl, phenyl-sulfonyl, tolyl-sulfonyl, lower alkanoyl, lower alkoxycarbonyl, lower aliphatic hydrocarbon, lower aliphatic hydrocarbon substituted by at least one member selected from the group consisting of phenyl, halogenphenyl, nitrophenyl, halogen, lower alkoxy and lower alkyl-mercapto, phenyl, naphthyl, phenyl substituted by a member selected from the group consisting of lower alkyl, lower alkoxy, nitro and halogen, naphthyl substituted by a member selected from the group consisting of lower alkyl, lower alkoxy, nitro and halogen.

6. The compound of the Formula I

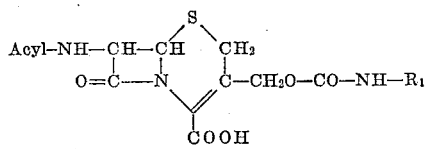

wherein "Acyl" represents a radical of the formula $$R_2(CH_2)_nCO$$

in which $n$ stands for a whole number from 0 to 4, and $R_2$ represents a member selected from the group consisting of phenyl, naphthyl, cycloalkyl having 5 to 6 ring carbon atoms and heterocyclyl having 5 to 6 ring members and the heteroatom of which is a member selected from the group consisting of nitrogen, sulfur and oxygen, and $R_1$ is a member selected from the group consisting of a lower aliphatic hydrocarbon, lower aliphatic hydrocarbon substituted by at least one member selected from the group consisting of phenyl, halogenphenyl, nitrophenyl, halogen, lower alkoxy and lower alkyl-mercapto, phenyl, naphthyl, phenyl substituted by a member selected from the group consisting of lower alkyl, lower alkoxy, nitro and halogen, naphthyl substituted by a member selected from the group consisting of lower alkyl, lower alkoxy, nitro and halogen.

7. The compound of the Formula I

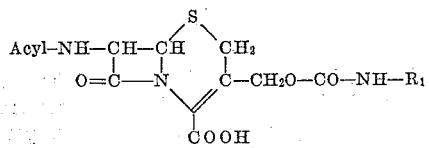

wherein "Acyl" represents a radical of the formula $$R_2(CH_2)_nCO$$

in which $n$ stands for a whole number from 1 to 4 and $R_2$ represents a member selected from the group consisting of phenyl, phenyloxy, phenylmercapto, monocyclic heterocyclyl with 5 to 6 ring atoms, monocyclic heterociyloxy with 5 to 6 ring atoms, monocyclic heterocyclylthio with 5 to 6 ring atoms, the heteroatom being a member selected from the group consisting of nitrogen, sulfur and oxygen, and $R_1$ is a member selected from the group consisting of a lower aliphatic hydrocarbon, lower aliphatic hydrocarbon substituted by at least one member selected from the group consisting of phenyl, halogenphenyl, nitrophenyl, halogen, lower alkoxy and lower alkyl-mercapto, phenyl, naphthyl, phenyl substituted by a member selected from the group consisting of lower alkyl, lower alkoxy, nitro and halogen, naphthyl substituted by a member selected from the group consisting of lower alkyl, lower alkoxy, nitro and halogen.

8. A compound of the Formula I

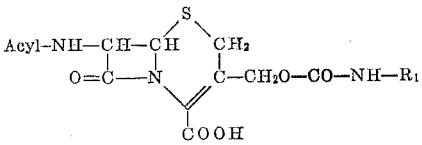
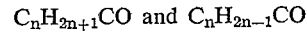

wherein "Acyl" represents a member selected from the group consisting of $$C_nH_{2n+1}CO \text{ and } C_nH_{2n-1}CO$$

in which $n$ represents a whole number from 1 to 7, and $R_1$ stands for a member selected from the group consisting of a lower aliphatic hydrocarbon, lower aliphatic hydrocarbon substituted by at least one member selected from the group consisting of phenyl, halogenphenyl, nitrophenyl, halogen, lower alkoxy and lower alkyl-mercapto, phenyl, naphthyl, phenyl substituted by a member selected from the group consisting of lower alkyl, lower alkoxy, nitro and halogen, naphthyl substituted by a member selected from the group consisting of lower alkyl, lower alkoxy, nitro and halogen.

9. A compound of the Formula I

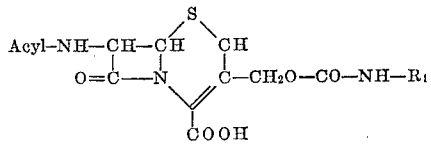

wherein "Acyl" represents a member selected from the group consisting of phenylacetyl, phenoxyacetyl, S-phenylthioacetyl and thienylacetyl, and $R_1$ stands for a member selected from the group consisting of lower alkyl and halogen-lower alkyl having 1-4 carbon atoms.

10. A member selected from the group consisting of O-desacetyl-O-($\beta$-chloroethylcarbamoyl) - 7 - thienyl-acetyl-amino-cephthalosporanic acid and a therapeutically acceptable salt thereof.

11. A member selected from the group consisting of O-desacetyl-O-($\beta$-chloroethylcarbamoyl) - 7 - phenylacetylamino-cephalosporanic acid and a therapeutically acceptable salt thereof.

12. A member selected from the group consisting of O-desacetyl-O-($\beta$-chloroethylcarbamoyl) - 7 - S-phenylthioacetylamino-cephalosporanic acid and a therapeutically acceptable salt thereof.

13. Therapeutically acceptable salts of the compounds claimed in claim 6.

14. Therapeutically acceptable salts of the compounds claimed in claim 7.

No references cited.

NICHOLAS S. RIZZO, *Primary Examiner.*